(12) United States Patent
Motonishi (10) Patent No.: US 7,841,066 B2
(45) Date of Patent: Nov. 30, 2010

(54) METHOD FOR CORRECTING FLOATING-TYPE MAGNETIC HEAD DEVICE MOUNTED IN HARD DISK DEVICE

(75) Inventor: Michiharu Motonishi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 797 days.

(21) Appl. No.: 11/880,808

(22) Filed: Jul. 24, 2007

(65) Prior Publication Data

US 2008/0055782 A1    Mar. 6, 2008

(30) Foreign Application Priority Data

Aug. 29, 2006    (JP)    ............................. 2006-231454

(51) Int. Cl.
*G11B 21/24*    (2006.01)
(52) U.S. Cl. .............. 29/603.03; 29/603.09; 360/244.2; 360/244.9; 219/121.6
(58) Field of Classification Search ............. 29/603.03, 29/603.04, 603.09; 219/121.6, 121.85; 360/244.2, 360/244.8, 244.9
See application file for complete search history.

(56) References Cited

U.S. PATENT DOCUMENTS

| 6,366,430 | B1 * | 4/2002 | Narayan et al. | ....... 29/603.03 X |
| 6,711,929 | B2 * | 3/2004 | Yamaguchi et al. | ... 219/121.6 X |

FOREIGN PATENT DOCUMENTS

JP    2000276724 A    * 10/2000

* cited by examiner

*Primary Examiner*—A. Dexter Tugbang
(74) *Attorney, Agent, or Firm*—Brinks Hofer Gilson & Lione (57) ABSTRACT

A correcting method for reducing variations in floating height and gram load of a floating-type magnetic head device is disclosed. The correcting method includes a first correcting step of detecting a roll-angle corresponding amount in the free state of the front end of the front end and bending the load beam in the direction where the roll-angle corresponding amount approaches zero, and a second correcting step of putting the floating-type magnetic head device into a temporarily mounted state with respect to the load beam, detecting a roll-angle corresponding amount at the tongue piece of the flexure in the temporarily mounted state, and bending at least one of the left and right outriggers in the direction where the roll-angle corresponding amount approaches zero.

7 Claims, 6 Drawing Sheets

METHOD FOR CORRECTING FLOATING-TYPE MAGNETIC HEAD DEVICE MOUNTED IN HARD DISK DEVICE

RELATED APPLICATIONS

This application claims the benefit of priority under 35 U.S.C. §119 to Japanese Patent Application No. 2006-231454, filed Aug. 29, 2006, which is hereby incorporated by reference in its entirety.

BACKGROUND

1. Technical Field

The present application relates to a method for correcting a floating-type magnetic head device mounted in a hard disk device.

2. Description of the Related Art

A floating-type magnetic head device includes a load beam that swings and extends over a rotating hard disk (recording medium), a head body (slider), and a flexure having an elastically flexible tongue piece fixed on a surface of the head body adjacent to the recording medium. When the rotation of the disk is stopped, the bottom surface of the head body comes in contact with the recording surface of the disk due to an elastic force of the load beam. When the rotation of the disk is started, air is introduced so as to flow between the head body and the disk surface along the moving direction of the disk, so that the head body floats over the disk surface due to a floating force associated with the air flow, as applied on the bottom surface of the head body.

In the floating-type magnetic head device, in order to precisely control the horizontal position of the head body and to apply a predetermined load to the magnetic head device, various correcting methods have been proposed. For example, techniques for correcting the shape (corresponding amount to a pitch angle or a roll angle) of the flexure so as to correct the position of the head body are disclosed in JP-A-2000-339894, JP-A-2001-357644 (U.S. Pat. No. 6,977,788B2), and JP-A-2002-15410. Also, techniques for deforming the load beam so as to adjust the magnitude of the load are disclosed in JP-A-1-227279, JP-A-2002-170351 (U.S. Pat. No. 6,823,581B2), JP-A-2002-260358 (U.S. Pat. No. 6,711,929B2), and JP-A-2004-82161 (US-A1-2004-037011).

However, even when the magnetic head device is corrected by such correcting methods, variations in floating height or in load (gram load) of the head body relative to the disk are generated in a mounted state. Strictly speaking, the purpose of correcting the floating-type magnetic head device is to minimize the variations in the floating height or in the gram load of the head body. It has been difficult to sufficiently correct the device by conventional correcting methods.

The present applicant has proposed a novel method for correcting the load beam (Japanese Patent Application No. 2005-88959). The method measures the amount of deformation of the load beam in the mounted state, particularly the deformation in a roll-angle direction. The load beam is corrected by bending the load beam based on the deformation amount in the direction where the roll angle approaches zero. The correcting method includes the steps of temporarily mounting the floating-type magnetic head device so as to float the head body over a rotating disk equivalent surface in a temporarily mounted state (same as the mounted state, but write/read operations are not performed in the temporarily mounted state); detecting a roll-angle corresponding amount at the front end of the load beam in the temporarily mounted state; and bending the load beam based on the roll-angle corresponding amount at the front end of the load beam in the direction where the roll angle at the front end of the load beam approaches zero.

SUMMARY

However, it was difficult to sufficiently correct the device by the novel method. Particularly, it was difficult to remove unbalanced gram load between left and right sides. The present invention has been made in line with the method proposed by the present application. The present invention proposes a method for correcting variations in floating height or in gram load of a floating-type magnetic head in a precise manner.

The inventors have searched for the causes of sufficient correction in the previous proposal. In the previous proposal, when the load beam is put into the temporarily mounted state, the load beam is deformed by the application of load. The shape of the load beam in the free state (before the load beam is put into the temporarily mounted state) is not considered in the previous proposal. Thus, the inventors have concluded that such a lack of consideration accounts for the sufficient correction in the previous proposal.

The present invention proposes a correcting method considering a shape error of the load beam in the free state. The correcting method is performed in two steps. First, the roll-angle corresponding amount is corrected by bending the load beam. Second, the correction is repeated by bending outriggers of a flexure.

In a first aspect, a floating-type magnetic head device includes a load beam made of a metallic material and that extends over a recording medium; and a flexure made of a metal material and disposed in the load beam adjacent to the recording medium. The flexure is provided with a fixed part fixed to the load beam; a pair of left and right outriggers that extends from the fixed part toward the load beam adjacent to a free end of the load beam; and a tongue piece that extends from a front end of the outriggers toward an inner area of the outriggers. The floating-type magnetic head device further includes a head body fixed on the surface of the tongue piece adjacent to the recording medium. During rotation of the recording medium, the head body floats over the recording medium. The correcting method includes a first detecting step of detecting a roll-angle corresponding amount at the front end of the load beam in a state where a base of the load beam is fixed on a reference surface so that the front end is put into a free state; a first bending step of, based on the roll-angle corresponding amount at the front end of the load beam detected in the first detecting step, bending the load beam in the direction where the roll angle at the front end of the load beam approaches zero; a temporarily mounting step of putting the floating-type magnetic head device that has undergone the first bending step into a temporarily mounted state so as to float the head body over a disk equivalent surface; a second detecting step of detecting a roll-angle corresponding amount at the tongue piece of the flexure in the temporarily mounted state; and a second bending step of, based on the roll-angle corresponding amount at the tongue piece of the flexure detected in the second detecting step, bending at least one of the left and right outriggers in the direction where the roll angle at the tongue piece of the flexure approaches zero.

The roll-angle corresponding amount does not need to be an angular value, but can be substantially estimated from the height difference at the front end of the load beam measured at two points spaced from each other in the track width direction.

In one embodiment, in the first and second bending steps, the bending of the load beam and the outriggers may be performed along a line inclined to a direction perpendicular to the longitudinal direction of the load beam. It may be practical to perform the bending of the load beam and the outriggers by irradiating the load beam and the outriggers with a laser beam. Preferably, the bending of the load beam is performed at a position of the load beam located closer to a swinging fulcrum of the load beam than to a connection point between the load beam and the flexure located at the front end extremity.

The irradiation of the load beam and the outriggers with the laser beam may be performed by controlling the intensity of the laser beam along the inclined line, controlling the irradiation intensity while the laser beam is applied in the track width direction, applying the laser beam to half the distance in the track width direction, or by applying the laser beam to one of the outriggers.

Preferably, the load beam is provided with at least one through-hole formed on a line of the load beam irradiated with the laser beam.

According to the correcting method for a floating-type magnetic head device, variations in floating height or in gram load of the head body can be reduced.

BRIEF DESCRIPTION OF THE DRAWINGS

The components in the figures are not necessarily to scale, emphasis instead being placed upon illustrating the principles of the present invention. Moreover, in the figures, like referenced numerals designate corresponding parts throughout the different views.

DESCRIPTION OF THE EXEMPLARY EMBODIMENTS

Exemplary embodiments may be better understood with reference to the drawings, but these examples are not intended to be of a limiting nature. Like numbered elements in the same or different drawings perform equivalent functions.

Figure 1:
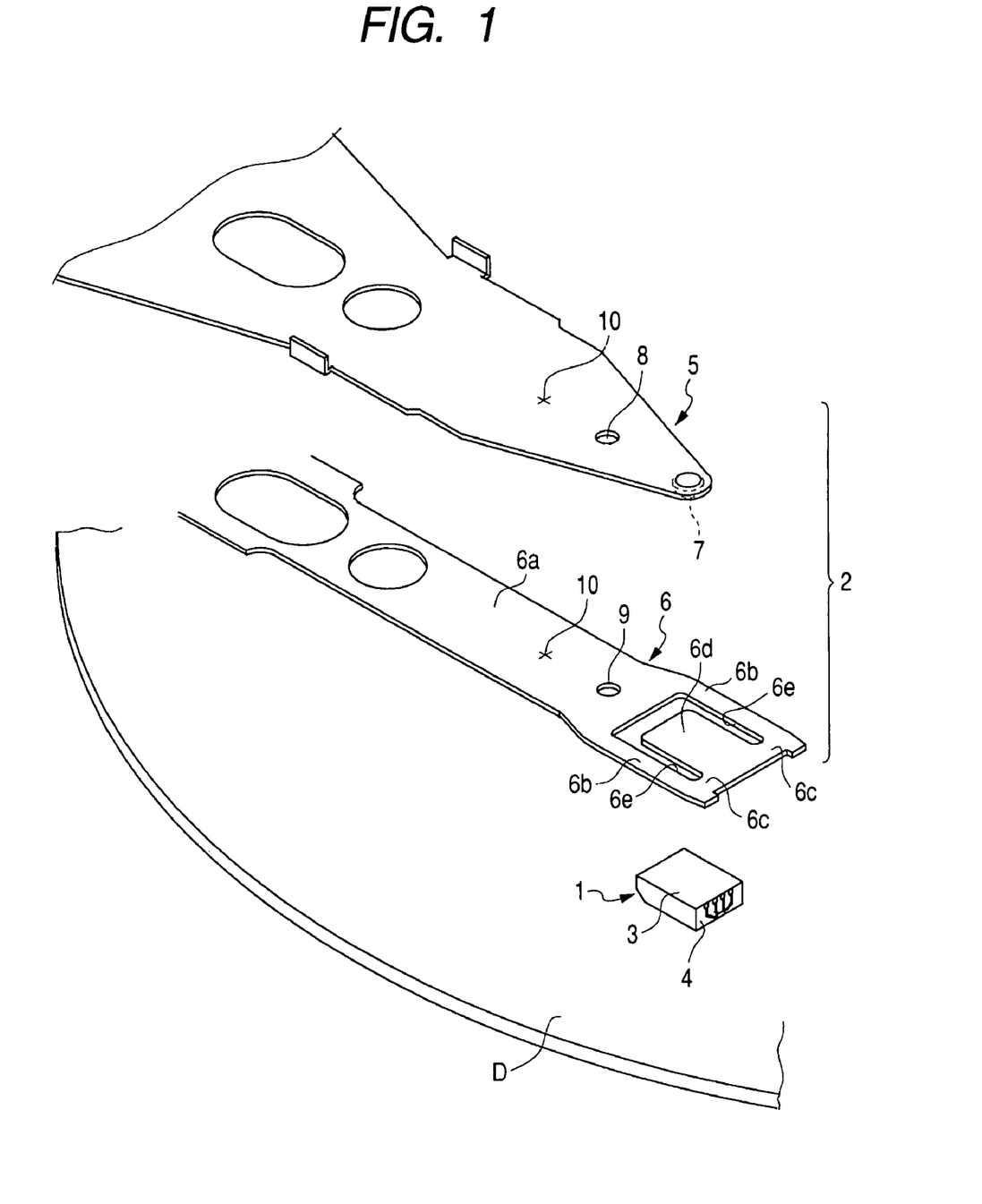
FIG. 1 is an exploded perspective view of an example of a floating-type magnetic head device suitable for performing a correcting method.
Figure 2:
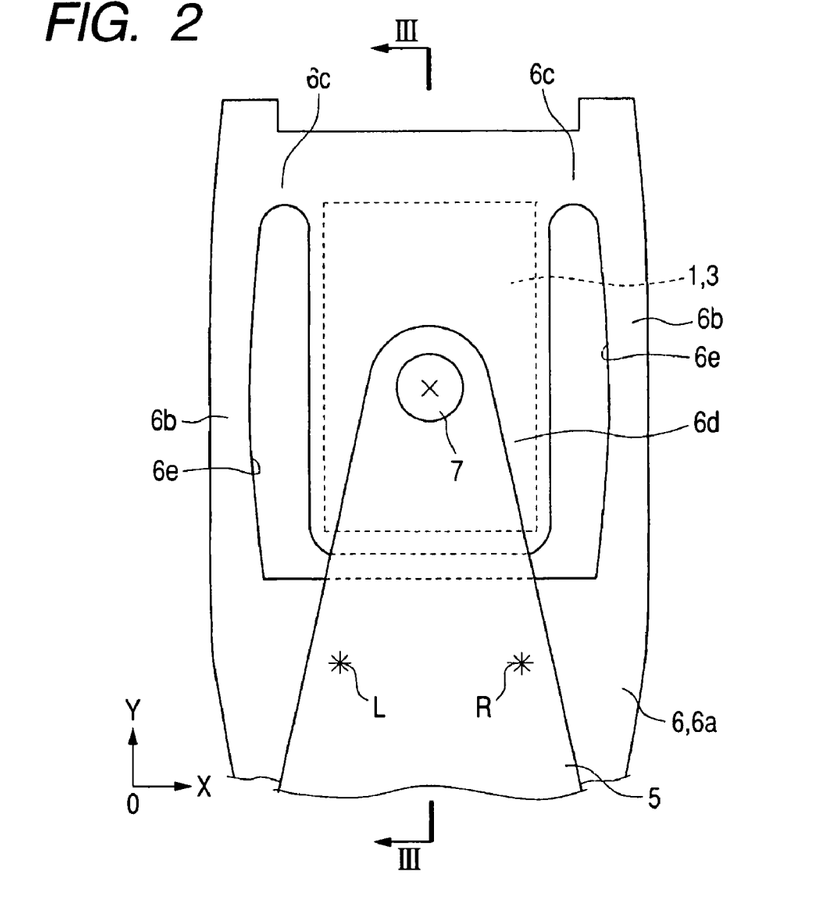
FIG. 2 is an enlarged plan view of a front end of a load beam and a flexure portion.
Figure 3:
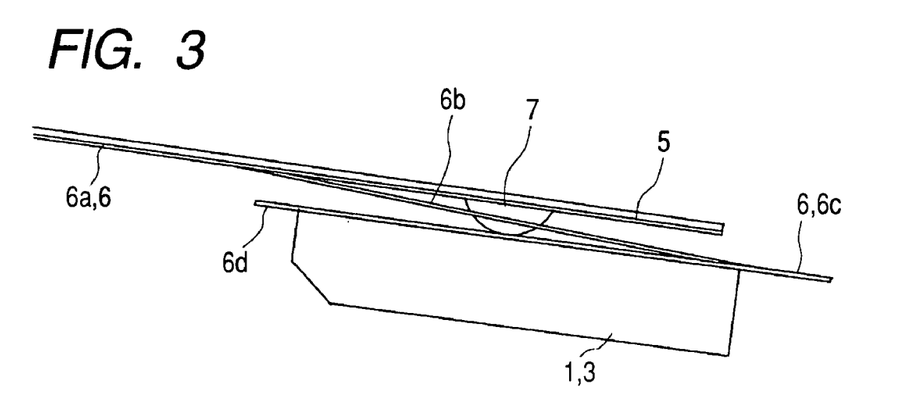
FIG. 3 is a schematic sectional view of a head body in a floating state at the line III-III of FIG. 2.

FIGS. 1 to 3 illustrate an example of a floating-type magnetic head device suitable for performing a correction method. The floating-type magnetic head device includes a head body 1 and a support member 2 for supporting the head body 1. The head body 1 is provided with a slider 3 disposed to face a recoding disk D (recording medium) (FIG. 3) such as a hard disk. A thin-film element 4 is arranged on an end face of the slider 3 adjacent to the trailing end thereof. The slider 3 is made of a ceramic material. The thin-film element 4 may include an MR head (read head) for reading out a magnetic signal by detecting a leakage field from the disk D using a magneto resistance effect and an inductive head (write head) including a coil formed in a pattern.

The support member 2 includes a load beam 5 having a swinging fulcrum located outside the circumference of the rotating disk D and disposed so as to be extendable over the disk D and a flexure 6 connected to the load beam 5. The load beam 5 and the flexure 6 are made of a leaf spring material (a metallic material, such as stainless steel). The load beam 5 may be a tapered flat plate having a hemispherical contact portion (hemispherical projection) 7 formed in the vicinity of the front end of the load beam 7 so as to protrude downward (toward the disk D).

The flexure 6 includes a fixed part 6a, a pair of left and right outriggers 6b extending from the fixed part 6a (toward the free end of the load beam 5), a pair of connection parts 6c extending inward from front ends of the pair of outriggers 6b, and a tongue piece 6d connected to the pair of connection parts 6c. A U-shaped slit 6e is formed between the tongue piece 6d, the outriggers 6b and the connection part 6c such that the tongue piece 6d is elastically deformable about the connection parts 6c relative to the outriggers 6b. As shown in FIG. 1, a positioning hole 9 is formed in the fixed part 6a. After the positioning hole 9 is positioned at a positioning hole 8 formed in the load beam 5, the fixed part 6a is fixed on the bottom surface of the load beam 5 (the surface adjacent to the disk D) by a method such as laser welding. One fixed point (mechanical connection portion) 10 is shown in FIG. 1; however, a plurality of the fixed points (not shown) are further provided at positions adjacent to the swinging fulcrum. The upper surface of the tongue piece 6d is abutted to the hemispherical contact portion 7 that protrudes downward from the load beam 7. The head body 1 bonded on the bottom surface of the tongue piece 6d can freely change its position using the apex of the hemispherical contact portion 7 as a fulcrum. The load beam 5 has an elastic force in the direction for bringing the head body 1 into contact with the disk D. On the bottom surfaces (surfaces adjacent to the disk D) of the load beam 5 and the flexure 6, wiring patterns are provided for connecting to the head body 1 (the thin-film element 4; not shown).

Figure 4:
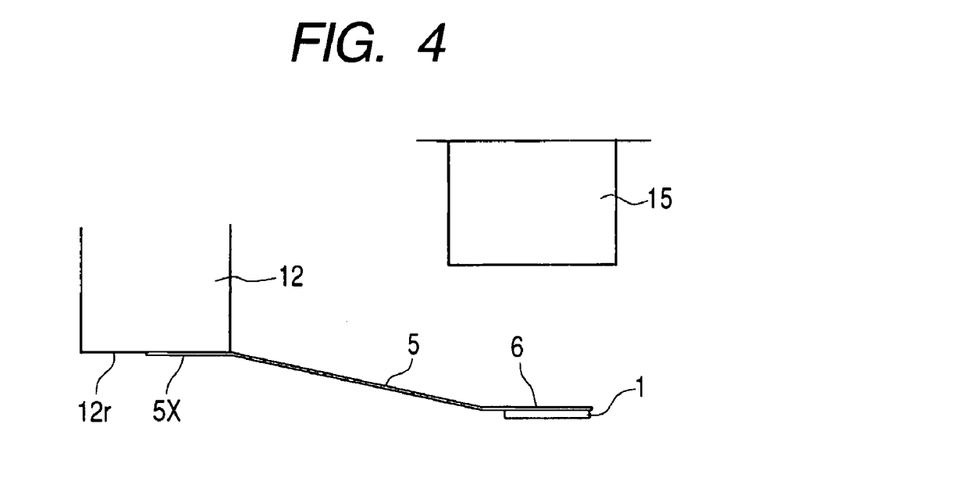
FIG. 4 is a conceptual side view of the floating-type magnetic head device shown in FIGS. 1 to 3, illustrating the state where the base of the load beam is pressed against a reference surface so as to be fixed on the reference surface and the load beam is maintained in a free state.

In this embodiment, when the floating-type magnetic head device is corrected, as a first correcting step, the base 5X of the load beam 5 is pressed against a reference surface 12r of the base plate 12 so as to be fixed on the reference surface 12r so that the load beam 5 is maintained in a free state, as shown in FIG. 4. The reference surface 12r is a precise reference plane. When the front end of the load beam 5 is parallel to the reference surface 12r, the roll angle (roll-angle corresponding amount) is zero (0). The roll angle is defined as an inclination of the load beam 5 from the reference surface 12r in a track width direction. The term "front end" denotes a position located adjacent to the hemispherical contact portion 7 and between the hemispherical contact portion 7 and the connection point 10 (or between the hemispherical contact portion 7 and the positioning hole 8 or 9).

The first correcting step includes a first detecting step of detecting the roll-angle corresponding amount at the front end of the load beam in a state that the load beam 5 is maintained in the free state; and a first bending step of bending the load beam based on the roll-angle corresponding amount calculated in the first detecting step in the direction where the roll angle approaches zero.

Figure 5:
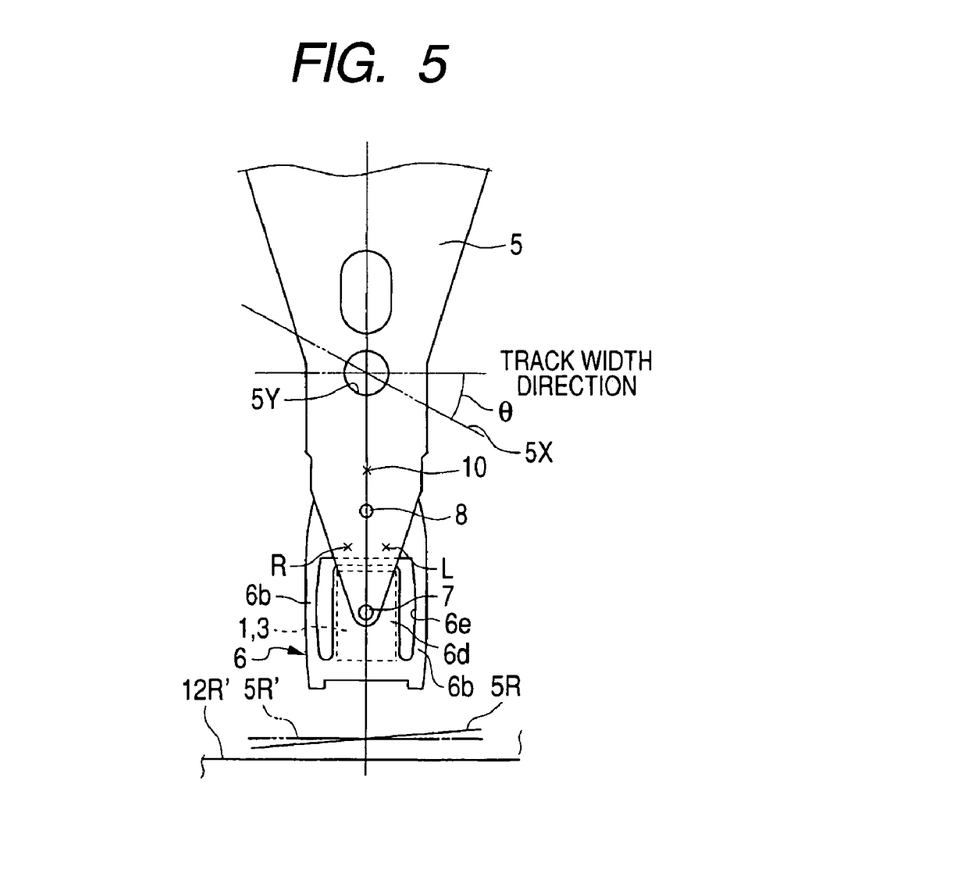
FIG. 5 is a drawing illustrating a first correcting step of the correcting method.
Figure 6:
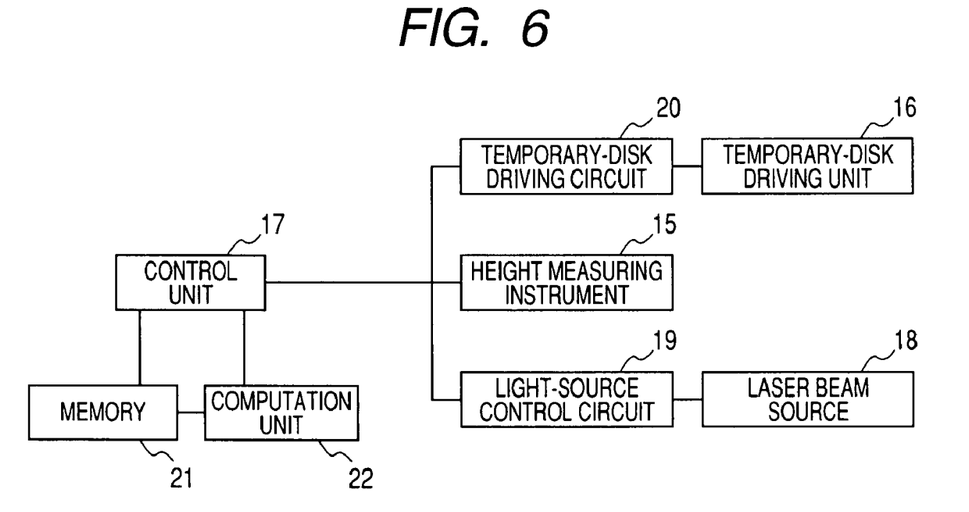
FIG. 6 is a block diagram of a control system of the floating-type magnetic head device suitable for performing the correcting method.

Specifically, as shown in FIG. 5, the roll-angle corresponding amount can be detected based on a two-point measurement by calculating a height difference of the front end of the load beam 5 from the reference surface 12r, the height being measured at two points spaced from each other in the track width direction. In FIG. 4, reference numeral 15 denotes a height measuring instrument that can be freely moved in X and Y directions so as to measure the height of the load beam 5 and the flexure 6 at an arbitrary position on the surfaces thereof. As shown in FIG. 6, the height measuring instrument 15 is connected to a control unit 17 so as to move in the X and Y directions in accordance with the control signal supplied from the control unit 17. The height measuring instrument 15 may use a laser displacement meter, an interference fringe displacement meter or other similar devices.

A solid line in a lower portion of FIG. 5 represents the roll-angle corresponding amount 5R at the front end of the load beam 5. The roll-angle corresponding amount 5R is depicted as a straight line connecting two points corresponding to the height of the load beam 5 from the reference surface 12r (and the surface 12r' parallel to the reference surface 12r), the height being measured at two points R and L (FIGS. 2 and 5) spaced from each other in the track width direction. That is, the roll-angle corresponding amount 5R is depicted as a straight line connecting two points corresponding to the height difference between the base plate 12 and the reference surface 12r. In this example, the measured roll-angle corresponding value 5R indicates that the height of the front end of the load beam 5 at the point L is higher than that at the point R. Reference numeral 5R' represents a situation where the roll angle (roll-angle corresponding amount) is zero. The roll angle does not need to be an angular value, but can be substantially estimated from the height difference (roll-angle corresponding amount) measured at two points spaced from each other in the track width direction.

In this embodiment, as a first bending step, the load beam 5 is bent based on the roll-angle corresponding amount detected in the first detecting step in the direction where the roll angle at the front end of the load beam approaches zero. By uniformly bending the load beam 5 along a line (inclined line) by an inclination angle θ to a direction perpendicular to the longitudinal direction of the load beam 5 (the track width direction in FIG. 5), the roll angle at the front end of the load beam can approach zero. When the load beam 5 is uniformly bent along the inclined line 5X shown in an upper portion of FIG. 5 in the direction where the front end is raised, the roll-angle corresponding amount at the front end of the load beam 5 is reduced. That is, the inclined line 5X is inclined so that the distance to the front end at the point R is larger than that at the point L. Hence, as the distance from the inclined line 5X increases, the raised amount of the front end is increased and the roll angle approaches zero. The direction of the inclined line 5X (inclination angle θ) can be determined based on the height difference between the points L and R.

Although the bending can be mechanically performed, for mass production, it may be practical that the bending is performed by means of laser beam irradiation. As shown in FIG. 6, in this embodiment, a laser beam source 18 for irradiating laser beam is connected to a light-source control circuit 19 for controlling the intensity and direction of the laser beam. The light-source control circuit 19 is also connected to the control unit 17. The laser beam source 18 may incorporate a semiconductor laser device, for example. When the load beam 5 is irradiated with laser beam having a specific intensity by the laser beam source 18 and then rapidly cooled (when laser beam are applied for a short time at atmospheric temperature), the load beam 5 is bent so that the line irradiated with the laser beam becomes a trough. The bending angle (the lift of the front end) depends on the intensity of the laser beam irradiated to the load beam 5.

Accordingly, the direction of the inclined line 5X can be determined based on the detection result of the roll-angle corresponding amount. The intensity of the laser beam can be determined in accordance with the required raised amount (lift) of the front end of the load beam 5.

That is, the relationship between the roll-angle corresponding amount and the combination of the direction of the inclined line 5X (inclination angle θ) and the intensity of the laser beam may be determined in advance and stored in a memory 21. Based on this relationship, the control unit 17 sets the direction of the inclined line 5X and the intensity of the laser beam so that the roll-angle corresponding amount calculated by the computation unit 22 falls within a predetermined range. After setting the direction of the inclined line 5X and the intensity of the laser beam, the control unit 17 transmits an instruction signal to the light-source control circuit 19 so as to assign the circuit to the emitting angle of the laser beam corresponding to the direction of the inclined line 5X and the intensity of the laser beam. The light-source control circuit 19 causes the laser beam source 18 to irradiate the laser beam in accordance with the instruction signal from the control unit 17.

In such a manner, by setting the direction of the inclined line 5X and the intensity of the laser beam based on the roll-angle corresponding amount and applying the laser beam, the load beam 5 can be corrected by the bending.

Also, by controlling the intensity of the laser beam along the inclined line 5X, controlling the irradiation intensity while the laser beam is applied in the track width direction, or by applying the laser beam to half the distance in the track width direction, the bending angle (floating height) at the front end of the load beam 5 can also be changed.

Preferably, the inclined line 5X (bending line) is set at a position located closer to the base (the swinging center when being mounted) than the connection point 10 between the load beam 5 and the flexure 6, the connection point 10 being located close to the front end extremity. If the inclined line 5X is set at a position located closer to the front end than the connection point 10, even when the roll angle at the front end of the load beam 5 approaches zero, the effect of improving the position of the head body 1 supported by the flexure 6 that is connected to the load beam 5 via the connection point 10 is small. Also, it is preferable to form a through hole 5Y on the inclined line 5X of the load beam 5 so that the load beam 5 is irradiated with the laser beam along the inclined line 5X. That is, it is preferable to align the inclined line 5X so as to intersect the through hole 5Y. By the existence of the through hole 5Y, the load beam 5 can be easily bent.

In this embodiment, after performing the first correcting step, a second correcting step is further executed. The second correcting step includes a temporary mounting step of temporarily mounting the floating-type magnetic head device having undergone the first correcting step so as to float the head body with respect to a rotating disk equivalent surface; a second detecting step of detecting a roll-angle corresponding amount at the tongue piece of the flexure in the temporarily mounted state; and a second bending step of bending at least one of the left and right outriggers based on the roll-angle corresponding amount at the tongue piece detected in the second detecting step in the direction where a roll angle at the front end approaches zero.

Figure 7:
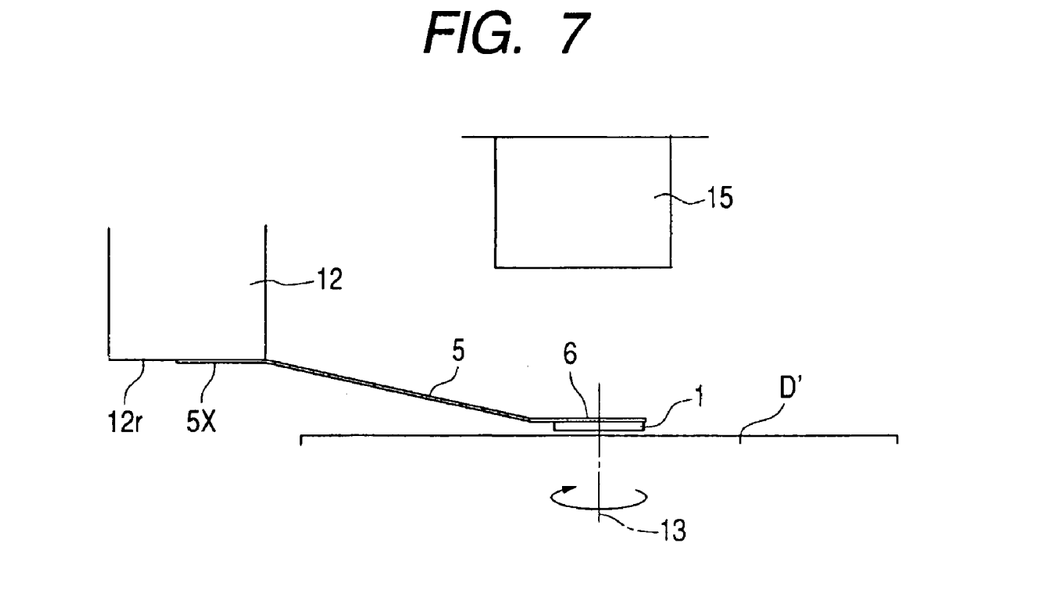
FIG. 7 is a conceptual side view illustrating a temporarily mounted state of the floating-type magnetic head device shown in FIGS. 1 to 3.
Figure 8:
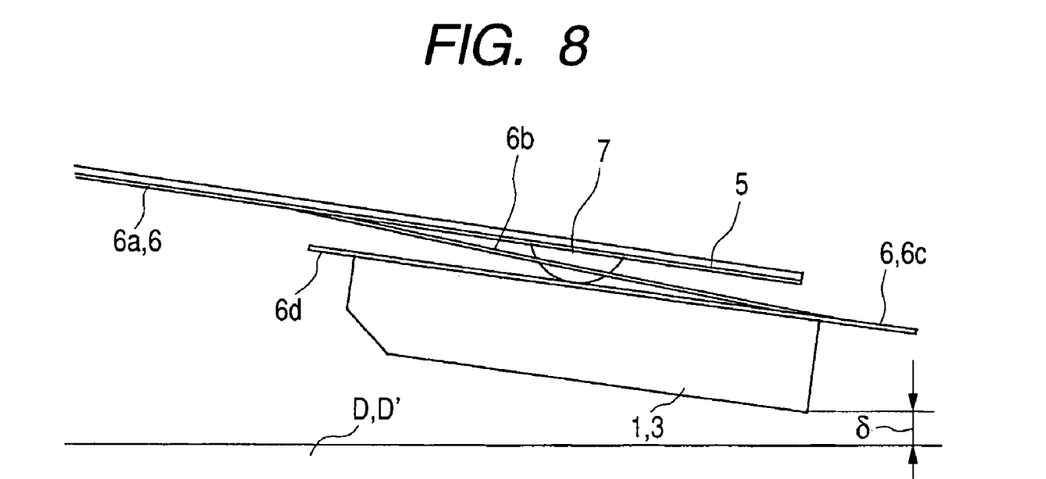
FIG. 8 is a schematic sectional view of the head body at the line III-III of FIG. 2, illustrating the state where the head body floats over a temporary disk D'.

As shown in FIG. 7, after the first correcting step (the first bending step), the magnetic head device is set on a temporary disk D' and is put in the temporarily mounted state. The temporary disk D' is fixed to a temporary-disk driving unit 16 (FIG. 6) rotating about a rotational center 13. The temporary-disk driving unit 16 is connected to a control unit 17 via a temporary-disk driving circuit 20. The temporary-disk driving circuit 20 supplies a drive signal (electric current) to the temporary-disk driving unit 16 when receiving a driving instruction signal from the control unit 17. The temporary-disk driving unit 16 rotates together with the temporary disk D' at a predetermined rotational speed corresponding to the drive signal. The difference between the mounted state and the temporarily mounted state is that write/read operations may not be performed in the temporarily mounted state, but in either mounting state, the head body 1 may be put in a floating state by rotating the disk D or the temporary disk D'. The base of the load beam 5 is pressed against the reference surface 12r of the base plate 12 so as to extend over the temporary disk D'. When the temporary disk D' is rotated about the rotational center 13, the head body 1 floats over the temporary disk D' as schematically shown in FIGS. 7 and 8. That is, the head body 1 assumes an inclined floating position over the temporary disk D' such that the leading side is higher than the trailing side. The floating height is denoted by δ in FIG. 8. In the floating state, the head body 1 swings about a contact point (contact portion) between the apex of the hemispherical contact portion 7 of the load beam 5 and the tongue piece 6d of the flexure 6 and follows the unevenness of the temporary disk D'.

In the second correcting step, a roll-angle corresponding amount at the tongue piece 6d of the flexure 6 is detected in the temporarily mounted state (second detecting step). As described above, the roll angle is defined as the inclination of the tongue piece 6d from the temporary disk D' in the track width direction. When the tongue piece 6d is parallel to the surface of the temporary disk D', the roll angle is zero (0). The reference surface 12r of the base plate 12 is arranged parallel to the surface of the temporary disk D'.

Figure 9A:
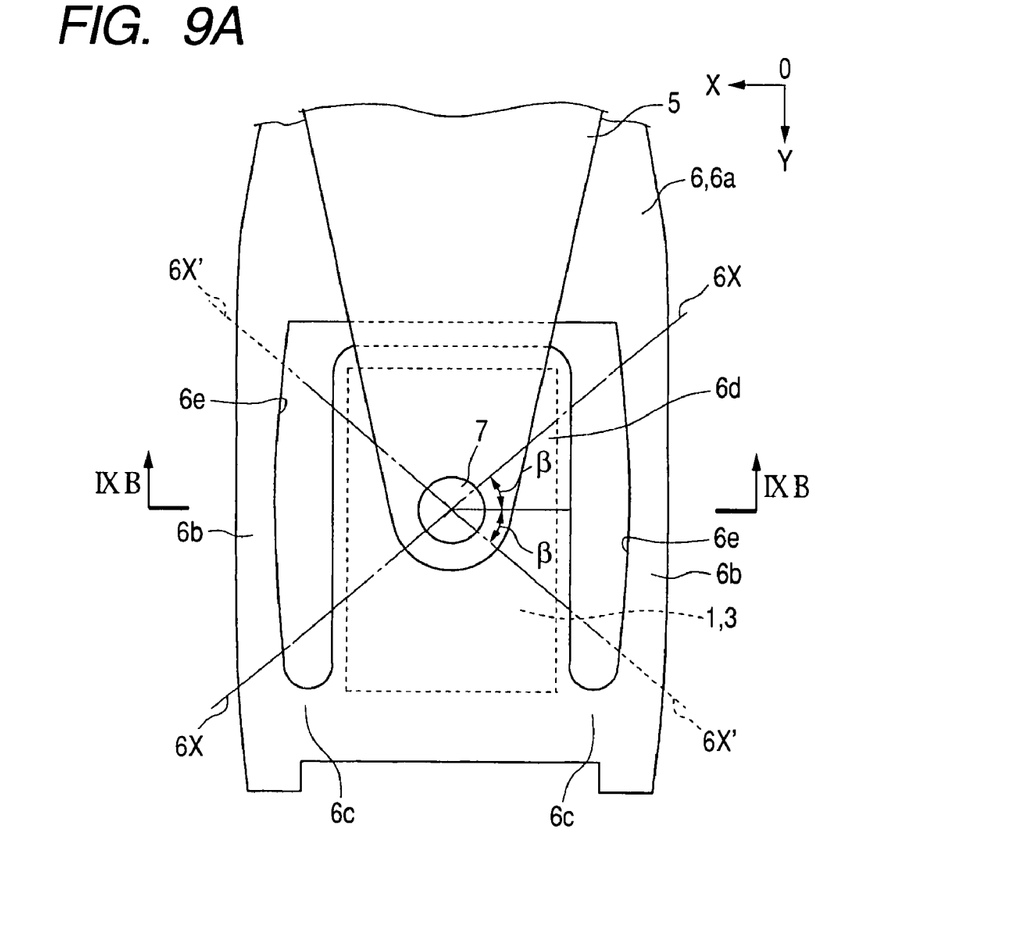
FIGS. 9A and 9B are drawings illustrating a second correcting step of the correcting method.

In order to measure (detect) the roll-angle corresponding amount at the tongue piece 6d, the temporary-disk driving unit 16 and the temporary disk D' fixed to the temporary-disk driving unit 16 are rotated in accordance with the driving instruction signal from the control unit 17. With the rotation, the head body 1 floats over the temporary disk D'. When the floating height δ is stabilized, the height measuring instrument 15 moves in X and Y directions in accordance with an instruction signal from the control unit 17 and measures the height between the point a (or b) (FIG. 9) on the tongue piece 6d of the flexure 6 and the surface of the temporary disk D'. The measured value is stored in the memory 21 connected to the control unit 17. After measuring the height at the point a (or b), the height measuring instrument 15 receives an instruction signal from the control unit 17 and measures the height between the point b (or a) and the surface of the temporary disk D'. The measured value is stored in the memory 21. Based on the measured values of the heights at the point a and the point b, a roll-angle corresponding amount is calculated by the computation unit 22 connected to the control unit 17, and is stored in the memory 21.

Figure 9B:
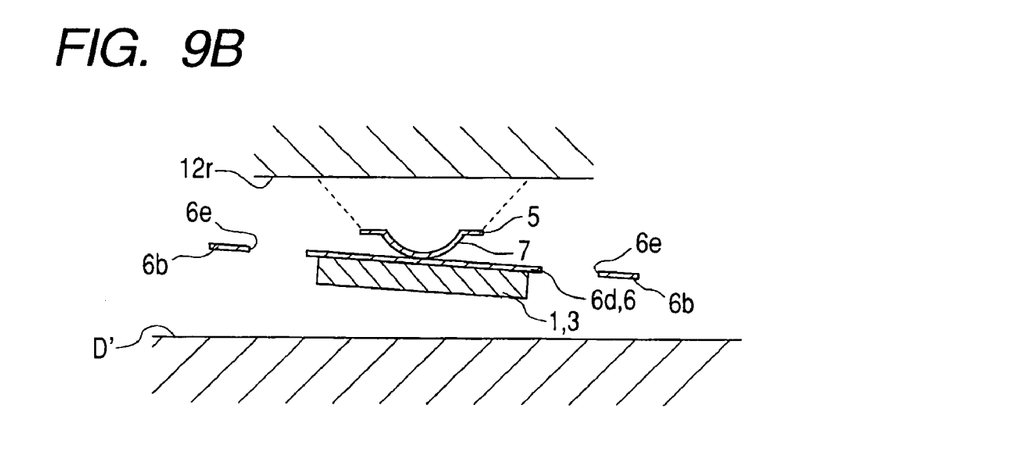

FIG. 9B is a sectional view taken along the line IXB-IXB in FIG. 9A. The roll-angle corresponding amount (inclination) at the tongue piece 6d of the flexure 6 is exaggerated in the drawing. The height difference between the left and right outriggers 6b and the positional relationship with the load beam 5 is also exaggerated. In the example of FIGS. 9A and 9B, the tongue piece 6d is rolled in the direction where the point b is closer to the temporary disk D' than the point a.

According to the second correcting step, in a second bending step, the left and right outriggers 6d of the flexure 6 are bent in the direction where the roll angle at the tongue piece 6d approaches zero, based on the detected value (inclination from the surface of the temporary disk D') of the roll-angle corresponding amount at the tongue piece 6d of the flexure detected in the second detecting step. FIGS. 9A and 9B illustrate an example of an irradiation line 6X when the bending is performed by irradiating the outriggers 6b with a laser beam along the irradiation line 6X, in a similar manner to the case of bending the load beam 5. The irradiation line 6X is inclined by an angle β to a direction (the track width direction in FIGS. 9A and 9B) perpendicular to the longitudinal direction of the outriggers 6b. When the left and right outriggers 6b are uniformly bent along the inclined line 6X shown in FIGS. 9A and 9B in the direction where the front end are raised, the roll-angle corresponding amount at the tongue piece 6d of the flexure 6 is reduced. That is, the inclined line 6X is inclined so that the distance to the front end at the point b is larger than that at the point a. Hence, as the distance from the inclined line 6X increases, the raised amount of the front end is increased and the roll angle approaches zero. The direction (inclination angle β) of the inclined line 6X can be determined based on the height difference between the points a and b. The same units and circuits as those used for the load beam 5 excepting a laser-beam irradiating circuit may be used for the outriggers 6b.

The correction of the bending may be performed by irradiating the bottom surfaces of the left and right outriggers 6b with a laser beam. By irradiating the bottom surfaces of the outriggers 6b with the laser beam along the irradiation line 6X' (inclination angle β'), the roll-angle corresponding amount at the tongue piece 6d of the flexure 5 can be reduced. In this case, the laser beam may be applied to one of the left and right outriggers 6b.

After the floating-type magnetic head device underwent the second correcting step, variations in floating height or in gram load of the floating-type magnetic head device can be reduced.

The load beam 5 and the outriggers 6b of the flexure 6 can be generally corrected by bending with one irradiating treatment with the laser beam. However, if required, the treatment may be repeated by changing irradiation conditions of the laser beam.

The irradiation positions of the laser beam illustrated in the above-described embodiment are set forth by way of illustration only. The irradiation position and intensity may be changed in accordance with the roll-angle corresponding amount of the tongue piece of the flexure.

The terms and descriptions used herein are set forth by way of illustration only and are not meant as limitations. Those skilled in the art will recognize that many variations can be made to the details of the above-described embodiments without departing from the underlying principles of the disclosure. The scope of the disclosure should therefore be determined only by the following claims (and their equivalents) in which all terms are to be understood in their broadest reasonable sense unless otherwise indicated.

What is claimed is:

1. A correcting method for a floating-type magnetic head device for use with a recording medium, the floating-type magnetic head device comprising:
   a load beam made of a metallic material and that extends over a recording medium;
   a flexure made of a metal material and disposed in the load beam adjacent to the recording medium, the flexure including a fixed part fixed to the load beam; a pair of left and right outriggers that extends from the fixed part toward the load beam adjacent to a free end of the load beam; and a tongue piece that extends from a front end of the outriggers toward an inner area of the outriggers; and a head body fixed on the surface of the tongue piece adjacent to the recording medium, wherein during rotation of the recording medium, the head body floats over the recording medium, the correcting method comprising:

a first detecting step of detecting a roll-angle corresponding amount at a front end of the load beam in a state where a base of the load beam is fixed on a reference surface so that the front end of the load beam is put into a free state;

a first bending step of, based on the roll-angle corresponding amount at the front end of the load beam detected in the first detecting step, bending the load beam in a direction where the roll angle at the front end of the load beam approaches zero;

a temporarily mounting step of putting the floating-type magnetic head device that has undergone the first bending step into a temporarily mounted state so as to float the head body over a disk equivalent surface;

a second detecting step of detecting a roll-angle corresponding amount at the tongue piece of the flexure in the temporarily mounted state; and a second bending step of, based on the roll-angle corresponding amount at the tongue piece of the flexure detected in the second detecting step, bending at least one of the left and right outriggers in a direction where the roll angle at the tongue piece of the flexure approaches zero.

2. The correcting method of claim 1, wherein in the first bending step, the bending of the load beam is performed along a line inclined to a direction perpendicular to a longitudinal direction of the load beam.

3. The correcting method of claim 1, wherein in the second bending step, the bending of the load beam and the outriggers is performed along a line inclined to a direction perpendicular to a longitudinal direction of the load beam.

4. The correcting method of claim 1, wherein in the first bending step, the bending of the load beam is performed by irradiating the load beam with a laser beam.

5. The correcting method of claim 4, wherein the load beam is provided with at least one through-hole disposed on a line of the load beam irradiated with the laser beam.

6. The correcting method of claim 1, wherein in the second bending step, the bending of the load beam and the outriggers is performed by irradiating the load beam with a laser beam.

7. The correcting method of claim 1, wherein in the first bending step, the bending of the load beam is performed at a position of the load beam located closer to a swinging fulcrum of the load beam than to a connection point between the load beam and the flexure located at a front end extremity of the load beam.

* * * * *